Patented Apr. 20, 1948

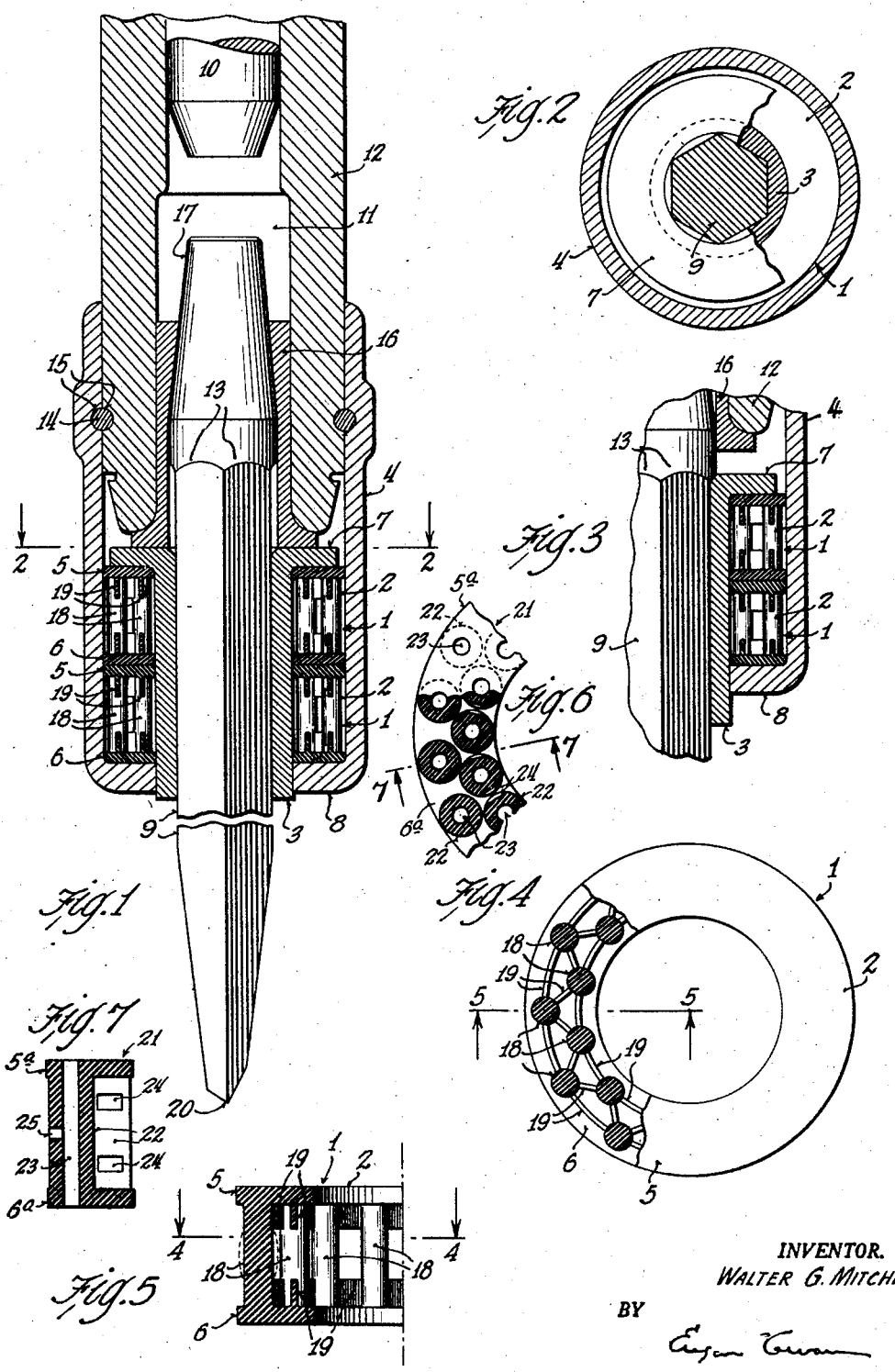

2,440,150

UNITED STATES PATENT OFFICE 2,440,150

COMPRESSION MEMBER

Walter G. Mitchell, Aurora, Ill., assignor to Independent Pneumatic Tool Company, Chicago, Ill., a corporation of Delaware Application January 31, 1945, Serial No. 575,426

6 Claims. (Cl. 279—19.6)

This invention relates to improvements in compression members of the type comprised of resilient rubber or equivalent material for absorbing shocks and stresses in fabricated structures.

In particular, the invention concerns compression members of the character shown and claimed in my copending application Serial No. 564,338, filed November 20, 1944, the specific form of compression member disclosed in this present application being a modified form of the invention defined in said copending application.

In the foregoing respect, my invention in its disclosure in the instant application consists in providing a compression member of resilient rubber or equivalent material and in which axially disposed, spaced columns of such material resist and dampen the forces applied on the member to compress it and which columns by their spaced arrangement allow for the circulation of air through the member to maintain it relatively cool in operation in performing its cushioning function under load.

A further object of my invention is to have an appreciable portion of the axial dimension of the member occupied by the columns to provide in total a relatively large air space within the member between the columns for an effective cooling action as the member is compressed and expanded in operation from repeated shocks or blows on the member as when used as a bumper member in a chisel retainer for a portable power operated hammer or other percussive tool.

A further object of my invention in respect to the instant disclosure is to provide the compression member with means interconnecting the columns to brace them against compressive or other forces applied on the member to stabilize the member as a manufactured article.

A further object of my invention is to provide said stabilizing means in the form of ribs or webs extending between and connected with the columns and constituting in conjunction therewith baffles to give turbulence to the air circulating through the member to enhance its cooling effect and thereby enable a resilient rubber material to be employed as the composition for the compression member without early failure thereof from the internal heat produced within the body of the member in its rapid and repeated flexing.

A further object of my invention consists in the combination of the herein defined compression member in the fabricated structure in which one or more of said members are employed, as for example the chisel retainer combination above noted.

The invention consists further in the combination and the structural features hereinafter described and claimed.

In the accompanying drawings—

Fig. 1 shows the compression member above defined in a chisel retainer of a pneumatic hammer, the retainer and the adjacent portion of the tool being shown in longitudinal section;

Fig. 2 is a cross-sectional view taken on line 2—2 of Fig. 1, the upper flange element of the retainer structure bearing on the adjacent compression member being broken away for the purpose of illustration;

Fig. 3 is a fragmentary view in longitudinal section of the parts shown in Fig. 1, the compression members being shown compressed by the mounting sleeve for the chisel;

Fig. 4 is a top plan view of the compression member removed from the retainer and partly in section to show the column and web arrangement of the construction;

Fig. 5 is a sectional view taken on line 5—5 of Fig. 4.

Fig. 6 is a fragmentary view partially in section of a modified form of my invention to be later described; and Fig. 7 is a sectional view taken on line 7—7 of Fig. 6 to show details of said modified form.

As shown in the drawings, the compression member 1 of my invention comprises a body portion 2 made of solid resilient rubber or equivalent material and of the size and shape required for the compression member to serve as a shock or jar absorber in a fabricated structure. For a chisel retainer for a portable pneumatic chipping hammer or other percussive tool, the compression member 1 is molded from the desired resilient material into annular form to fit about the mounting sleeve 3 of the retainer and be located in the space between the mounting sleeve 3 and the outer sleeve 4 of the retainer device as depicted in Fig. 1.

In accordance with my invention, the compression member 1 in being molded or otherwise fashioned is provided with upper and lower wall sections 5, 6, at the opposite ends of the member and which wall sections form the seating surfaces for the member in use. As will be noted from the drawings, the upper wall section 5 seats against the overhanging flange 7 at the upper or inner end of the mounting sleeve 3, while the lower wall section 6 seats against either the introverted flange 8 at the outer end of the retainer sleeve 4 or against the adjacent lower compression member 1 when two or more of them are used in the superimposed arrangement shown in Figs. 1 and 2.

The flange 8 forms a stop for the compression member assembly and supports the latter for compression in response to blows of the chisel 9 when struck by the hammering piston 10 in its reciprocation in the bore 11 of the tool barrel 12. This occurs when the piston 10 is operated when the chisel 9 is out of contact with the work or when the chisel glances off the work in a tool operation. It is to be understood that the piston 10 is compressed air operated as in tools of the character shown.

The blows of the chisel 9 are translated to the compression members 1 when the chisel is projected sufficiently through the mounting sleeve 3 to bring the inset shoulders 13 of the chisel against the upper end of the mounting sleeve 3 as shown in Fig. 3. When this occurs the mounting sleeve 3, which is in the path of the shoulders, is moved downwardly or outwardly and the compression members 1 are compressed between the flange 7 on the mounting sleeve 3 and the flange 8 of the retainer sleeve 4. The resilient composition of the compression members 1 absorbs or cushions these blows which are relatively rapid from a rapidly reciprocating piston.

The shoulders 13 on the chisel prevent the chisel from dropping or being shot out of the barrel and the cushioning action of the compression members relieves the retainer sleeve 4 and the tool barrel 12 of such impacts. In this connection I might remark that the retainer sleeve 4 is releasably secured to the barrel 12 by any desired fastener means, the showing in Fig. 1 indicating that a type of fastening element 14 is used which fits into matching grooves 15, 15 in the barrel 12 and the retainer sleeve 4, respectively.

The total mass of the compression members 1, 1 in Fig. 1 when not compressed or under load is sufficient to keep the inner or upper end of the mounting sleeve 3 against the bushing 16 which mounts the chisel 9 in the bore 11 at the nose end of the barrel 12. The inner end of the chisel shank has an inwardly tapered portion 17 and the bore of the bushing 16 is tapered complementary to limit the extent to which the chisel may extend into the barrel to receive the hammer blows of the piston 10.

As shown in the drawings, the compression member 1 is formed with a plurality of internal columns 18, 18 extending between the wall sections 5, 6 and integrally connected therewith as detailed in Fig. 5. The preferred way of providing for this connection is by molding the compression member as hereinbefore indicated. The columns 18 extend axially of the member 1 or in the direction of the applied compressive force and may be made of substantially the same diameter, but not necessarily so. The columns 18 are grouped or arranged about the axis of the member in spaced relation, both circumferentially and with respect to each other, as shown in Figs. 4 and 5. This arrangement provides cells or internal spaces within the member for the circulation of air therethrough for maintaining the member relatively cool in work, that is, in flexing in the application and the release of a load thereon.

The resilient columns 18 tend to change in section in response to a compressive force on the member as indicated in dotted lines in Fig. 5. Also, the wall sections 5, 6 move relatively towards and from each other in a flexing action of the member and these motions provide for the intake and ejection of air with respect to the spaces between the columns and the wall sections to create a circulation of air through the member for cooling the same. The movement of the parts under the inherent resiliency of the rubber material to expand when released draws air into the spaces between the columns and the wall sections, while a reverse movement of the parts under a compressive force ejects the air producing the air circulation or air flow just mentioned. The air flow keeps the compression member relatively cool in the rapid and repeated flexings when in use. This prolongs the life and effectiveness of these compression members, especially when made of a resilient rubber material.

The air circulation created by the novel construction of the member 1 carries off the internal heat produced therein by friction and enables resilient rubber material to be used for bumpers in chisel retainers without early deterioration by internal friction as heretofore.

To give the column formation stability against lateral displacement and to hold them substantially upright in operation of the member as a cushion element under the usual conditions, I provide the member 1 in molding it with a rib or web formation as shown in Figs. 4 and 5. These webs are marked 19, 19 and are arranged to interconnect the columns 18 adjacent their upper and lower ends, that is, where the columns join the wall sections 5, 6. The webs extend axially of the columns and terminate sufficiently short of each other so as not to hinder the ingress and egress of air between the columns and the wall sections 5, 6 of the member. In this respect, the webs 19 and the columns form baffles to give the air turbulence in its passage between the columns and more efficient cooling results.

It will be noted that the columns 18 are disposed between the inner and outer peripheries of the member 1 and that the cells or air spaces between the columns open to the exterior of the member about its outer edges. The sleeve 3 extends through a central opening in the flange 8 with sufficient clearance for ease of movement and the inflow and outflow of air to the space occupied by the compression member assembly. Air can also find entry to this assembly through the bushing 16.

The webs 19 are arranged in the desired angular relation shown to brace the columns against the forces tending to collapse or distort them.

Where the chisel 9 extends through the mounting sleeve 3, the chisel shank is hexagonal or other non-circular shape in cross section, and the bore of the sleeve 3 has complementary shape to guide and support the chisel. The cutting end 20 of the chisel is at its outer end as shown in Fig. 1.

In the modified structure shown in Figs. 6 and 7, the compression member 21 is molded or otherwise formed from the desired resilient material and has upper and lower wall sections 5a, 6a and an arrangement of integral axially interposed columns 22, 22 as before, except that columns are made hollow to have a bore 23 extending longitudinally therethrough and opening to the exterior of the compression member 21 through the upper and lower wall sections 5a, 6a as detailed in Figs. 6 and 7. These bores 23 permit the flow of air through the hollow columns for cooling the same in the operation of the device.

The columns 22 in the form shown in Figs. 6 and 7 are made larger in diameter than the columns in the previous figures and, hence, are disposed in closer relation between the lateral edges of the compression member. In the showing in Fig. 6, the columns 22 almost touch tangentially. This increase in column size gives the compression member greater stability and resistance. To facilitate the flow of cooling air between the columns 22, I provide one or more of them with lateral air flow passages 24, 24, one in each column and oppositely disposed so that the combined dimension of each two registering passages 24 allows for a relatively large flow of air. As shown in Fig. 7, each column 22 which is provided with the passages 24 has the latter arranged adjacent to the upper and the lower wall sections 5a, 6a, respectively. For air flow purposes, one or more of the columns 22 is each provided with a port opening 25 connecting its bore 23 with the outside of the compression member as shown in Fig. 7.

The spacing between the columns 22 gives the internal structure of the device a cellular effect for the ingress and egress of air for cooling purpose, but by the closer spacing shown in Fig. 6 the passages 24 provided in the sides surfaces of the columns facilitates this air flow.

The details of construction and arrangement of parts shown and described may be variously changed and modified without departing from the spirit and scope of my invention, except as pointed out in the annexed claims.

I claim as my invention:

1. A compression member of the character described comprising, a body member made of a resilient rubber-like material and having upper and lower end wall sections and a complement of columns integrally connected with and extending continuously between said end wall sections, said columns being disposed between the lateral edges of the member and disposed in spaced relation to provide spaces within the member for the ingress and egress of air to cool the member in flexing in response to a compressive force thereon, and a web formation between and interconnected with the columns and the adjacent end wall sections to brace the same, the webs at one end of the compression member extending generally towards the webs at the opposite end of the compression member and terminating short of each other to provide baffles and an opening therebetween for the passage of cooling air.

2. A compression member of the character described comprising, a body member made of a resilient rubber-like material and having upper and lower wall sections and a complement of columns therebetween, said columns being disposed between the lateral edges of the member and disposed in spaced relation to provide spaces within the member for the ingress and egress of air to cool the member in flexing in response to a compressive force thereon, and a web formation between and interconnected with the columns to brace the same, said webs being disposed at the opposite ends of the columns where joined to said upper and lower wall sections.

3. A compression member of the character described comprising, a body member of resilient material and formed to provide upper and lower end wall sections with a complement of columns integrally connected with and extending continuously between said upper and lower end wall sections to resist a compressive force applied on the member in the direction in which the columns extend, one or more of said columns being made hollow to provide a bore for the passage of air therethrough and said bores opening through at least one of said end wall sections.

4. A compression member of the character described comprising, a body member of resilient material and formed to provide upper and lower end wall sections with a complement of columns integrally connected with said upper and lower end wall sections and extending continuously therebetween to resist a compressive force applied on the member in the direction in which the columns extend, one or more of said columns being made hollow to provide a bore for the passage of air therethrough, certain of said hollow columns each having a definite port intermediate its ends connecting the bore with the exterior of the member.

5. The combination with the barrel of a percussive tool having a power operated hammering piston reciprocable therein, of a chisel with shoulders insertible into the barrel to receive the blows of the piston, a retainer device for the chisel having an outer sleeve secured to the barrel and an inner or mounting sleeve for the chisel in the path of said shoulders, said outer sleeve having an inwardly extending flange at its outer end and said inner sleeve having an outwardly extending flange at its inner end, and resilient bumper means supported between said flanges about the mounting sleeve for absorbing the impacts of the shoulders on the mounting sleeve when struck thereby, said bumper means being comprised of a plurality of superimposed compression members, each having axially spaced upper and lower end wall sections at the opposite ends of the compression member and a complement of axially extending columns between and integrally connected with said end wall sections for holding the columns and the end wall sections in fixed relation, the columns of each compression member being spaced apart between the outer peripheries of the compression member for the flow of air therethrough to cool the same, the compression members at the ends of the bumper means having their outermost end wall sections in contact with the flanges of the respective sleeve members, and their other end wall sections in contact with each other.

6. The combination as defined in claim 5 characterized by the fact that each compression member has webs interconnected with the columns and its end wall sections and extending axially of the compression member to brace the same.

WALTER G. MITCHELL.

REFERENCES CITED

The following references are of record in the file of this patent:

UNITED STATES PATENTS

| Number | Name | Date |
| --- | --- | --- |
| 132,765 | King | Nov. 5, 1872 |
| 1,108,488 | Bugg | Aug. 25, 1914 |
| 1,882,520 | Pollard | May 19, 1930 |
| 1,994,234 | Shreover | May 27, 1930 |
| 2,395,949 | Wilkins | Mar. 5, 1946 |

FOREIGN PATENTS

| Number | Country | Date |
| --- | --- | --- |
| 140,465 | Great Britain | June 20, 1921 |